Patented Dec. 29, 1931

1,838,456

UNITED STATES PATENT OFFICE

SIEGFRIED SKRAUP, OF WURZBURG, AND OTTO HIRSCHLER, OF DUSSELDORF-OBER-KASSEL, GERMANY, ASSIGNORS TO RHEINISCHE KAMPFER-FABRIK GESELLSCHAFT MIT BESCHRANKTER-HAFTUNG, OF DUSSELDORF-OBERKASSEL, GERMANY

PROCESS FOR THE PRODUCTION OF A CINEOL-CONTAINING OIL MIXTURE

No Drawing. Application filed April 4, 1930, Serial No. 441,732, and in Germany April 15, 1929.

It is known from the technical literature that cineol can be prepared from terpin or terpin hydrate by splitting out water with the aid of sulphuric acid, phosphoric acid, acetic acid, potassium bisulphate and the like. Such a process is, for example, described in "Lehrbuch der Organischen Chemie" by Viktor Meyer and Paul Jacobson, vol 2, part 1, on page 909 et seq. There is obtained thereby, mainly a mixture of $\alpha$- and $\beta$-terpineol, and as by-products the oil mixture known in the trade as terpinol, which contains as well as numerous hydrocarbons such as limonene, $\alpha$-, $\beta$-, and $\delta$-terpinene, terpinolene, menthenol, dipentene also 1.4- and 1.8-cineol. As stated in the above mentioned literature reference, the process is carried out by strongly heating terpin or terpin hydrate with dilute sulphuric acid. However, as is also stated in the above mentioned literature reference, only quite small quantities of cineol are obtained by this process. The applicants' experiments have shown that the eucalyptol-containing by-products, which are obtained by this process, only amount to about 5 to 10% of the total oil mixture obtained.

Scientific methods for the preparation of 1.4-cineol from a terpin of melting point 116°–117° C. are also known (Wallach, Liebig's Annalen vol. 392, page 61 et seq.), 1.4-cineol is, however, technically valueless whereas the valuable eucalyptol is a 1.8-cineol. If the process described by Wallach for the treatment of the said terpin with oxalic acid is carried out at the steam distillation temperature using terpin hydrate as the initial material, hydrocarbons are almost exclusively obtained besides small quantities of a mixture of 1.4- and 1.8-cineol as well as terpineol. At low temperatures the oxalic acid mentioned by Wallach has practically no action upon terpin hydrate.

Other methods of treatment of terpineol with agents for splitting out water are also mentioned by Wallach (Annalen vol. 275, pages 105–106). Hereby there were obtained by the fractional distillation of the reaction mixture, fractions in which such small quantities of a mixture of 1.4- and 1.8-cineol were present that a technical employment of these methods for the preparation of eucalyptol could in no case be imagined.

According to the present invention it has been found, that the valuable 1.8-cineol-containing oil mixture may be obtained as the main product if the reaction is effected at temperatures below 80° C. As treating agents there may be employed sulphuric acid, phosphoric acid and the like compounds already described in the literature, such as, for example bisulphate or also hydroxylated acids, as for example, a 11.2 molar zinc chloride solution (see Liebig's Annalen der Chemie, vol. 455, pages 237 and 238), or sulphonic acids such as $\alpha$- and $\beta$-naphthalene sulphonic acids and the like. As has been ascertained this lowering of temperature can be effected in various ways. If dilute sulphuric acid containing for example 30 to 40% of $H_2SO_4$ is employed, good results are obtained if the reaction is carried out at temperatures of about 30 to 40° C. This condition can be readily maintained if the reaction is carried out with good evacuation of the reaction vessel. The temperature is suitably kept the lower, the stronger the acid employed. Thus for example when using a 60% sulphuric acid temperatures of from $-8°$ C. to $-15°$ C. have been found to be suitable.

As initial materials for the process of this invention those terpene compounds which on treatment with acidic reacting agents may be finally converted into terpin hydrate, i. e. compounds of the formulæ $C_{10}H_{20}O_2, C_{10}H_{18}O$ and $C_{10}H_{16}$. The common name "terpene compounds" shall be understood to include the hydrogenated derivatives of cymol and their substitution products as well as allied hydrocarbons, such as pinene, sabinene and the like and such aliphatic alcohols, as geraniol linalool and the like, which by formation of a cycle of carbon atoms easily may be converted into the named cyclic terpene compounds. Particularly suitable for the purposes of our present invention are such compounds as for example, terpin, terpin hydrate, terpineol, terpinenol and others. Further, terpene hydrocarbons, for example pinene, sabinene, etc., which can likewise be converted by treatment with dilute sulphuric acid into the above named compounds can also be used as initial materials. The reaction proceeds in essentially the same way, despite the varying composition of the initial material mentioned. When compounds such as terpineol, terpinenol and the like are employed, these initial materials first form, by the addition of water, the intermediate terpins, from which by the splitting out of water the desired cineol is then formed.

After the reaction has been effected the working up of the required end product may be performed in various ways. By effecting the reaction under vacuum the eucalyptol-containing oil mixture may be separated simultaneously by vacuum distillation of the reaction mixture. If the reaction is carried out with concentrated acid at a low temperature without the employment of a vacuum the eucalyptol-containing oil mixture may be extracted from the reaction solution by indifferent solvents which under the conditions given dissolve the reaction products without removing the initial materials, for example by means of chloroform, toluene and the like.

By carrying out the process in the way stated a yield of about 70% of a eucalyptol-containing oil mixture is obtained, whilst about 30% of terpineol can be recovered. This residue can be subjected to the same treatment as described above, so that ultimately the whole of the initial material can be converted practically without loss into eucalyptol-containing oil mixture.

The high yield obtained according to the invention is obviously due to the fact that the eucalyptol formed is immediately removed from the action of the treating agent, whereas according to the hitherto known processes the eucalyptol formed was exposed to the further attack of the acid.

Examples 1. 5 kgms. of 30 to 40% sulphuric acid or phosphoric acid is introduced into a closed stirring apparatus and slowly heated under vacuum to boiling (about 35° C.). Then terpineol is allowed to flow into the acid from a dropping funnel as slowly as the oil passes over. It is desirable to have a very good condenser to avoid loss. The distillation is so adjusted that the same quantities of water and terpineol run in continuously as oil and water distills off. From 2.2 kgms. of terpineol about 2110 gms. of an oil mixture is obtained, which by vacuum distillation gives 1430 gms. of eucalyptol-containing oil mixture (containing about 45% of hydrocarbons such as limonene, terpinolene, $\alpha$-, $\beta$-, and $\delta$-terpinene and about 22% each of 1.4- and 1.8-cineol). 640 gms. of terpineol are recovered as well, which can be subjected to the same process.

2. 2.5 kgms. of 60% sulphuric acid is placed in a stirring apparatus and cooled under stirring to $-10°$ C. Then about 300 gms. of terpin is added to it drop by drop. During the stirring toluene which absorbs the oil formed is allowed to flow in slowly through the hollow stirrer. The extraction agent can be drawn off by means of a tube laterally attached at the top of the stirrer. The reaction proceeds slowly and is completed in about 80-90 hours. By fractionally distilling the toluene about 260 gms. of eucalyptol-containing oil mixture is obtained containing about 45% hydrocarbons and about 22% each of 1.4- and 1.8-cineol.

What we claim is:—

1. A process for the preparation of 1,8-cineol-containing oil-mixtures comprising using as initial materials terpene compounds which on treatment with acidic reacting agents may be converted finally into terpin hydrate, treating the said compounds with aqueous solutions of acidic reacting substances at temperatures below 80° C. and immediately removing the reaction products from the action of the treating agent.

2. A process for the preparation of 1,8-cineol-containing oil mixtures comprising using as initial materials terpene compounds of the molecular formula $C_{10}H_{20}O_2$ which on treatment with acidic reacting agents may be converted finally into terpin hydrate, treating the said compounds with aqueous solutions of acidic reacting substances at temperatures below 80° C. and immediately removing the reaction products from the action of the treating agent.

3. A process for the preparation of 1,8-cineol-containing oil mixtures comprising using as initial materials terpene compounds of the molecular formula $C_{10}H_{18}O$ which on treatment with acidic reacting agents may be converted finally into terpin hydrate, treating the said compounds with aqueous solutions of acidic reacting substances at temperatures below 80° C. and immediately removing the reaction products from the action of the treating agent.

4. A process for the preparation of 1,8-cineol-containing oil mixtures comprising using as initial materials terpene compounds of the molecular formula $C_{10}H_{16}$ which on treatment with acidic reacting agents may be converted finally into terpin hydrate, treating the said compounds with aqueous solutions of acidic reacting substances at temperatures below 80° C. and immediately removing the reaction products from the action of the treating agent.

5. A process for the preparation of 1,8-cineol-containing oil mixtures comprising using as initial materials terpene compounds which on treatment with acidic reacting agents may be converted finally into terpin hydrate, treating the said compounds with aqueous solutions of acidic reacting substances at temperatures below 0° C. and immediately removing the reaction products from the action of the treating agent.

6. A process for the preparation of 1,8-cineol-containing oil mixtures comprising using as initial materials terpene compounds which on treatment with acidic reacting agents may be converted finally into terpin hydrate, treating the said compounds under vacuum with aqueous solutions of acidic reacting substances at temperatures below 80° C. and immediately removing the reaction products from the action of the treating agent.

7. A process for the preparation of 1,8-cineol-containing oil mixtures comprising using as initial materials terpene compounds which on treatment with acidic reacting agents may be converted finally into terpin hydrate, treating the said compounds under vacuum with sulphuric acid at temperatures below 80° C. and immediately removing the reaction products from the action of the treating agent.

8. A process for the preparation of 1,8-cineol-containing oil mixtures comprising using as initial materials terpene compounds which on treatment with acidic reacting agents may be converted finally into terpin hydrate, treating the said compounds under vacuum with 40% sulphuric acid at temperatures of about 30–40° C. and immediately removing the reaction products from the action of the treating agent by means of distillation with steam.

9. A process for the preparation of 1,8-cineol-containing oil mixtures comprising using as initial materials terpene compounds which on treatment with acidic reacting agents may be converted finally into terpin hydrate, treating the said compounds with 60% sulphuric acid at temperatures below 0° C. and immediately removing the reaction products from the action of the treating agent by extracting same by means of an indifferent solvent adapted to dissolve the reaction products without removing the initial materials.

10. A process for the preparation of 1,8-cineol-containing oil mixtures comprising using as initial materials terpene compounds which on treatment with acidic reacting agents may be converted finally into terpin hydrate, treating the said compounds with 60% sulphuric acid at temperatures below 0° C. and immediately removing the reaction products from the action of the treating agent by extracting same by means of an hydrocarbon.

11. A process for the preparation of 1,8-cineol-containing oil mixtures comprising using as initial materials terpene compounds which on treatment with acidic reacting agents may be converted finally into terpin hydrate, treating the said compounds with 60% sulphuric acid at temperatures below 0° C. and immediately removing the reaction products from the action of the treating agent by extracting same by means of an halogen-substituted hydrocarbon.

In testimony whereof we affix our signatures.

SIEGFRIED SKRAUP.
OTTO HIRSCHLER.